(12) United States Patent
Parvarandeh

(10) Patent No.: US 9,239,254 B1
(45) Date of Patent: Jan. 19, 2016

(54) AMBIENT TEMPERATURE MEASUREMENT

(75) Inventor: Pirooz Parvarandeh, Los Altos Hills, CA (US)

(73) Assignee: Maxim Integrated Products, Inc., San Jose, CA (US)

( * ) Notice: Subject to any disclaimer, the term of this patent is extended or adjusted under 35 U.S.C. 154(b) by 912 days.

(21) Appl. No.: 13/451,415

(22) Filed: Apr. 19, 2012

(51) Int. Cl.
  *G01K 1/00* (2006.01)
  *G01D 21/00* (2006.01)
  *G01K 7/42* (2006.01)

(52) U.S. Cl.
  CPC . *G01D 21/00* (2013.01); *G01K 7/42* (2013.01)

(58) Field of Classification Search
  None
  See application file for complete search history.

(56) References Cited

U.S. PATENT DOCUMENTS

| | | | |
|---|---|---|---|
| 2002/0067599 A1* | 6/2002 | Mann | H01L 23/3672 361/704 |
| 2011/0137607 A1* | 6/2011 | Hsieh | G01D 21/00 702/130 |

\* cited by examiner

*Primary Examiner* — Aditya Bhat
(74) *Attorney, Agent, or Firm* — Advent, LLP

(57) ABSTRACT

A temperature measuring device includes a heat plate exposed to the ambient, one or more sensor chips, and one or more device electronics that include a power transmitter, a wireless communication receiving block, and a processor. Each sensor chip includes a wireless communication transmitting block, a temperature sensor, a signal processing block, and an energy harvesting circuit. The heat plate and the sensor chips are positioned within an indent formed in an exposed surface of a device cover, such as a glass cover. The energy harvesting circuit harvests energy from an electromagnetic signal transmitted by the power transmitter. Temperature data sensed by each temperature sensor is wirelessly transmitted by the wireless communication transmitting block to the wireless communication receiving block. The processor determines an ambient temperature corrected for heat influences on the temperature sensors by internal device electronics. The temperature measuring device is implemented within a mobile electronics device.

18 Claims, 4 Drawing Sheets

AMBIENT TEMPERATURE MEASUREMENT

FIELD OF THE INVENTION

The present invention relates to the field of temperature measurement. More particularly, the present invention relates to the field of ambient temperature measurement using a temperature sensor within an electronic device.

BACKGROUND OF THE INVENTION

Temperature sensors are commonly used to measure the ambient temperature. However, implementing a temperature sensor within an electronic device for the purpose of measuring ambient temperature poses challenges. Electronic devices generate heat which affects the measurements made by the temperature sensor. If the objective is to measure the ambient temperature, such as the room temperature, and not the temperature of the electronic device within which the temperature sensor is mounted, then the temperature sensor either must be isolated from the heat generating portion of the electronic device, or the sensed temperature must be adjusted to account for that portion attributable to the heat generation of the electronic device. Adjusting the sensed temperature measurements to compensate for the internal heat generation is difficult as the amount of heat generated within the electronic device varies based on current power being consumed, such as the amount of processing power being used, and other operational aspects of the device. Orientation of the device, such as standing up or laying down, and the relative position of the temperature sensor may also influence the temperature readings since heat rises.

The location of the temperature sensor on or within the electronic device influences the measured temperature results. If the temperature sensor is positioned within the housing of the electronic device, then the temperature sensor is exposed to the heat generating components of the electronic device, thereby influencing the sensed temperature measurements. Further, there is little airflow into the housing for measuring of the ambient air temperature outside the housing. As such, positioning the temperature sensor within the electronic device housing for the purpose of measuring ambient temperature is not effective.

The temperature sensor can alternatively be positioned on an outer surface of the electronic device. However, typical housings are made of heat conducting material, such as metal, and therefore conduct heat generated from within the electronic device, again influencing the sensed temperature measurements. Also, many users of handheld electronic devices, such as cellular telephones, use protective cases over the device to protect from damage. Such cases block a temperature sensor positioned on the external housing. Some electronics devices have a surface made of a non-conductive material, such as a display surface of a cellular telephone having an exposed glass layer. When the temperature sensor is placed on the external side of the non-conducting glass layer, the glass layer insulates the temperature sensor from the heat generating components internal to the device. This insulation reduces the affects of the heat generating components on the sensed temperature measurements.

Positioning the temperature sensor on the external side of the glass layer provides insulation from the heat generating components within the electronic device. However, simply placing the temperature sensor on the exposed surface of the glass layer is not amenable for protecting the sensor as the sensor protrudes from the surface, exposing the sensor to potentially damaging contact. Additionally, temperature sensors are typically wired to electronic components to receive power and to transmit the measured sensed temperatures. The temperature sensor is wired to the electronic components used to operate the electronic device, which are also the heat generating components. The wired connection is heat conducting, and as such heat is conducted from the heat generating components to the temperature sensor via the wired connection. Providing a wired connection through the glass cover also poses manufacturing difficulties.

Accordingly, how can the temperature sensor distinguish between the heat generated by the electronic device and the ambient temperature? Further, in order to measure the ambient temperature, the temperature sensor needs to be exposed to the ambient air. How can the temperature sensor be assembled into the electronic device such that the temperature sensor is sufficiently exposed to the ambient air? Still further, the temperature sensor must be insensitive to errors due to device orientation, humidity, pressure, and other environmental and device related factors that may impact the temperature sensor measurement.

SUMMARY OF THE INVENTION

Embodiments of a temperature measuring device include a heat plate exposed to the ambient, one or more sensor chips, and one or more internal device electronics that include a power transmitter, a wireless communication receiving block, and a processor. In some embodiments, the temperature measuring device is implemented within a mobile electronics device, such as a cellular telephone. In some embodiments, the heat plate is a metal layer or other highly thermally conductive material. The heat plate is a good heat conductor and also protects an underlying sensor chip from mechanical damage. Each sensor chip includes a wireless communication transmitting block, a temperature sensor, a signal processing block, and an energy harvesting circuit. In some embodiments, the heat plate and the one or more sensor chips are positioned within an indent formed in an exposed surface of a thermally insulted device cover, such as a glass cover or other thermally insulated housing. In some embodiments, the heat plate and the one or more sensor chips can be positioned within a user button, such as the power button. In some embodiments, the temperature sensor assembly can be embedded in a protective cover or carrying case of the device. Accordingly, use of the term "cover" generally refers to surfaces that are exposed to the ambient. The energy harvesting circuit within each sensor chip harvests energy from an electromagnetic signal transmitted by the power transmitter. In some embodiments, the power transmitter is a circuit specifically designed for transmitting energy to be harvested. In other embodiments, the power transmitter also serves as the device communications transmitter, such as a cellular telephone transmitter that may periodically transmit to a base station. Temperature data sensed by each temperature sensor is wirelessly transmitted by the wireless communication transmitting block to the wireless communication receiving block. In this manner, the sensor chips are not wired to the internal device electronics. The processor is configured to process the temperature data received from each of the sensor chips. In some embodiments, the processor determines an ambient temperature corrected for heat influences on the temperature sensors by internal device electronics.

In an aspect, an electronics device is disclosed that has a device housing and one or more heat generating device electronics positioned within the device housing. The electronics device includes a heat plate, a first sensor chip, and a second sensor chip. The device electronics include a power transmitter, a wireless communication receiving block, and a processor. The heat plate is exposed to the ambient. The power transmitter is configured to transmit an electromagnetic signal. The first sensor chip includes a first temperature sensor thermally coupled to the heat plate and configured to measure first temperature data, a first energy harvesting circuit configured to harvest energy from the transmitted electromagnetic signal, and a first wireless communication transmitting block configured to transmit the first temperature data. The second sensor chip includes a second temperature sensor configured to measure second temperature data, a second energy harvesting circuit configured to harvest energy from the transmitted electromagnetic signal, and a second wireless communication block configured to transmit the second temperature data. The wireless communication receiving block is configured to receive the transmitted first temperature data and the transmitted second temperature data. The processor is coupled to the wireless communication receiving block and configured to calculate an ambient temperature according to the first temperature data and the second temperature data.

In some embodiments, the first sensor chip is stacked on top of the second sensor chip. In some embodiments, the processor is configured to perform an algorithm to calculate the ambient temperature, wherein the ambient temperature is a function of the first temperature data, the second temperature data, a first thermal resistance between the heat plate and the first temperature sensor, and a second thermal resistance between the first temperature sensor and the second temperature sensor. In some embodiments, the electronic device also includes one or more of a pressure sensor, a humidity sensor, and a gyroscope, and the first thermal resistance is a function of data measured by one or more of the pressure sensor, the humidity sensor, and the gyroscope. In some embodiments, the second thermal resistance is a function of data measured by one or more of the pressure sensor, the humidity sensor, and the gyroscope. In some embodiments, the first thermal resistance, the second thermal resistance, or both are a function of a current power expenditure of the electronic device.

In some embodiments, the electronic device also includes a cover coupled to the device housing, wherein the cover is made of an insulating material and is positioned to separate the device electronics from the ambient environment. In some embodiments, the cover includes an indent formed in an exposed surface of the cover, wherein the heat plate, the first sensor chip, and the second sensor chip are positioned within the indent. In some embodiments, the heat plate includes a first surface exposed to the ambient and a second surface opposite the first surface and facing the first sensor chip, wherein the first surface of the heat plate is co-planar with the exposed surface of the cover. In some embodiments, the insulating material comprises glass.

In some embodiments, the electronic device also includes a thermal interface material coupled between the heat plate and the first temperature sensor of the first sensor chip. In some embodiments, the first sensor chip also includes a first signal processing circuit and the second sensor chip also includes a second signal processing circuit. In some embodiments, the heat plate, the first sensor chip, and the second sensor chip are integrated within an insulating material to form a packaged temperature sensor assembly. In some embodiments, a size and shape of the packaged temperature sensor assembly is configured to match a size and shape of the indent. In some embodiments, the electronic device is a mobile electronic device. In some embodiments, the second temperature sensor is positioned further from the heat plate and closer to the power transmitter, the wireless communication receiving block, and the processor than the first temperature sensor. In some embodiments, the first wireless communication transmitting block and the second wireless communication transmitting block are configured to transmit the first temperature data at a different frequency than the second temperature data.

In another aspect, another electronics device is disclosed that has a device housing and one or more heat generating device electronics positioned within the device housing. The electronics device includes a heat plate, an integrated circuit, an energy harvesting circuit, and a wireless communication transmitting block. The device electronics include a power transmitter, a wireless communication receiving block, and a processor. The heat plate is exposed to the ambient. The power transmitter is configured to transmit an electromagnetic signal. The integrated circuit is thermally coupled to the heat plate. The integrated circuit has a first P-N junction for providing first temperature data and a second P-N junction for providing second temperature data. The first P-N junction is positioned at a different depth within the integrated circuit than the second P-N junction. The energy harvesting circuit is configured to harvest energy from the transmitted electromagnetic signal, wherein the integrated circuit is coupled to the energy harvesting circuit. The wireless communication transmitting block is coupled to the energy harvesting circuit and to the integrated circuit, wherein the wireless communication transmitting block is configured to transmit the first temperature data and the second temperature data. The wireless communication receiving block is configured to receive the transmitted first temperature data and the transmitted second temperature data. The processor is coupled to the wireless communication receiving block and configured to calculate an ambient temperature according to the first temperature data and the second temperature data.

In yet another aspect, another electronics device is disclosed having a device housing and one or more heat generating device electronics positioned within the device housing. The electronics device includes a heat plate and a sensor chip. The device electronics include a power transmitter, a wireless communication receiving block, and a processor. The heat plate is exposed to the ambient. The power transmitter is configured to transmit an electromagnetic signal. The sensor chip includes a temperature sensor thermally coupled to the heat plate and configured to measure temperature data, an energy harvesting circuit configured to harvest energy from the transmitted electromagnetic signal, and a wireless communication transmitting block configured to transmit the first temperature data. The wireless communication receiving block is configured to receive the transmitted temperature data. The processor is coupled to the wireless communication receiving block and is configured to calculate an ambient temperature according to the temperature data.

BRIEF DESCRIPTION OF THE DRAWINGS

Several example embodiments are described with reference to the drawings, wherein like components are provided with like reference numerals. The example embodiments are intended to illustrate, but not to limit, the invention. The drawings include the following figures.

DETAILED DESCRIPTION OF THE EMBODIMENTS

Embodiments of the present application are directed to a temperature measuring device. Those of ordinary skill in the art will realize that the following detailed description of the temperature measuring device is illustrative only and is not intended to be in any way limiting. Other embodiments of the temperature measuring device will readily suggest themselves to such skilled persons having the benefit of this disclosure.

Reference will now be made in detail to implementations of the temperature measuring device as illustrated in the accompanying drawings. The same reference indicators will be used throughout the drawings and the following detailed description to refer to the same or like parts. In the interest of clarity, not all of the routine features of the implementations described herein are shown and described. It will, of course, be appreciated that in the development of any such actual implementation, numerous implementation-specific decisions must be made in order to achieve the developer's specific goals, such as compliance with application and business related constraints, and that these specific goals will vary from one implementation to another and from one developer to another. Moreover, it will be appreciated that such a development effort might be complex and time-consuming, but would nevertheless be a routine undertaking of engineering for those of ordinary skill in the art having the benefit of this disclosure.

Figure 1:
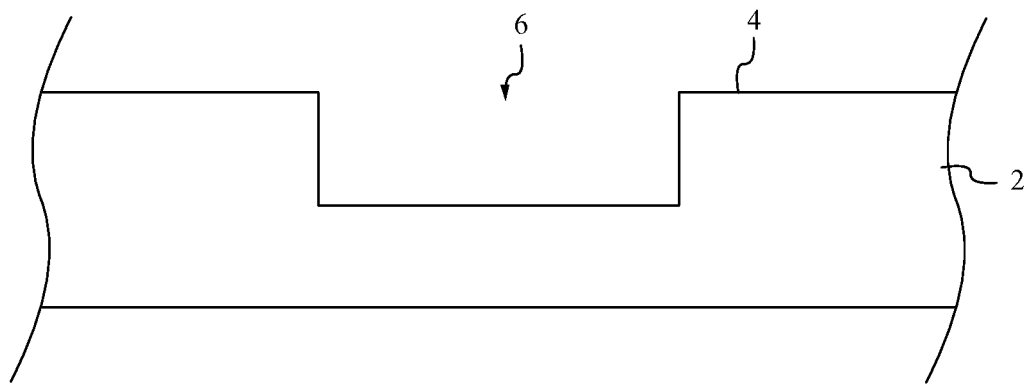
FIG. 1 illustrates a cut-out side view of a portion of a device housing having an indent formed in an exposed surface according to an embodiment.
Figure 2:
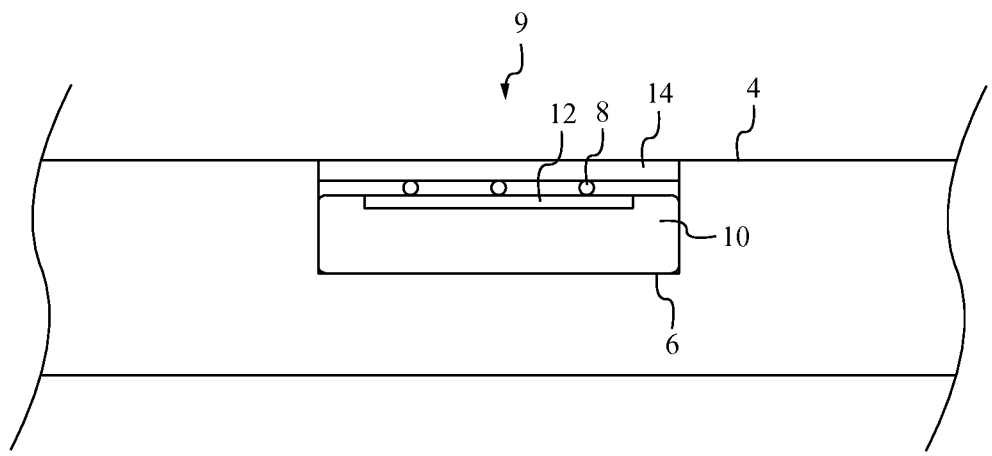
FIG. 2 illustrates the configuration of FIG. 1 including a temperature sensor assembly positioned in the indent.

FIG. 1 illustrates a cut-out side view of a portion of a device housing having an indent formed in an exposed surface according to an embodiment. In some embodiments, the device housing is for a mobile electronics device, such as a cellular telephone. In some embodiments, the portion of the device housing having the indent is a top cover of the device. The portion of the device housing having an indent is described hereafter as being a glass cover, which is commonly used as the top cover of a cellular telephone or other mobile electronic devices. In general, the portion of the device housing having the indent is non-metallic, having good thermal insulation characteristics. It is understood that the portion of the device housing with indent is not restricted to the top cover of the device housing, but can alternatively be configured as a side or bottom portion of the device housing. As shown in FIG. 1, an indent 6 is formed in an external surface 4 of a top glass cover 2. The surface 4 is exposed to the ambient environment. The indent 6 is configured to receive a temperature sensor assembly 9, as shown in FIG. 2. The temperature sensor assembly 9 includes a sensor chip 10 having a temperature sensor 12, and a heat plate, such as a metal layer 14. The metal layer 14 is thermally coupled to the sensor chip 10 using a thermal interface material, such as solder balls 8. It is understood that alternative thermal interface materials can be used. The temperature sensor assembly 9 is secured in the indent 6, such as using an adhesive. The metal layer 14 covers the temperature sensor 12 so that temperature sensor 12 is protected from direct exposure to the environment. In some embodiments, the exposed surface of the metal layer 14 is co-planar with the exposed surface 4. Once the temperature sensor assembly 9 is positioned within the indent 6, a polishing step can be performed to achieve this result.

Figure 3:
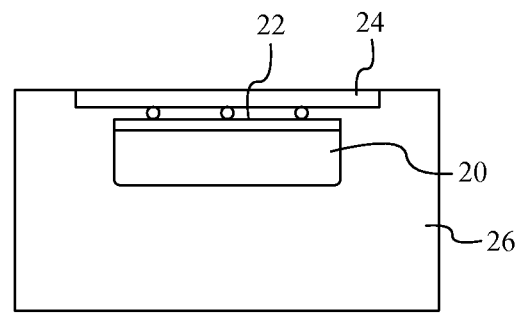
FIGS. 3-7 illustrate various exemplary configurations of the temperature sensor assembly according to some embodiments.
Figure 4:
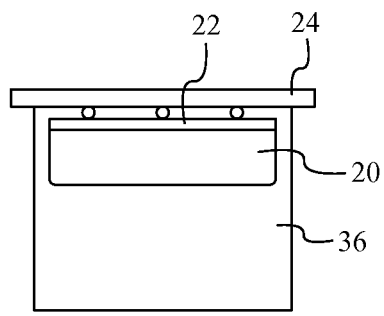
Figure 5:
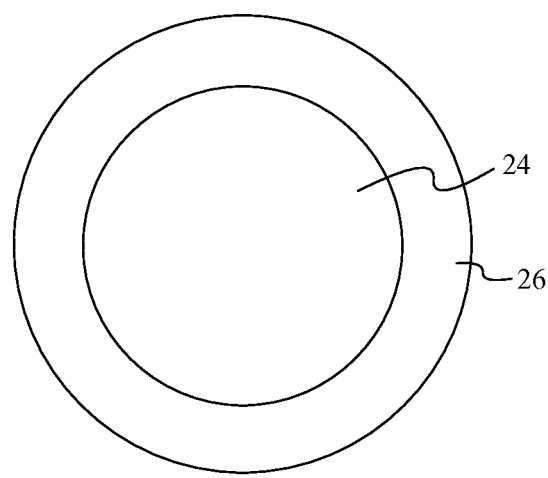
Figure 6:
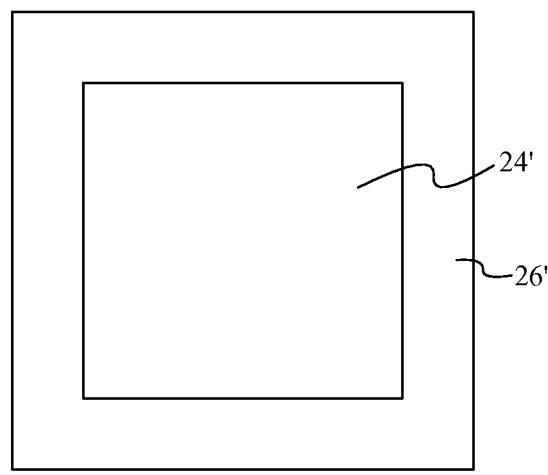
Figure 7:
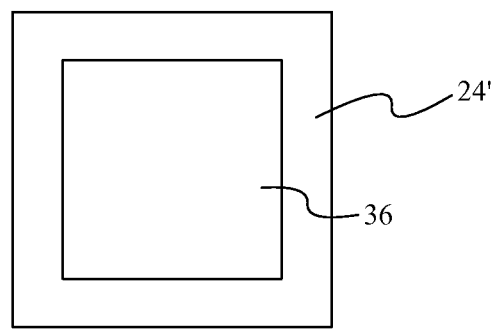

The temperature sensor assembly 9 can be assembled as an integrated package. FIGS. 3-7 illustrate various exemplary configurations of the temperature sensor assembly according to some embodiments. FIG. 3 shows a metal layer 24 extending beyond the footprint of a sensor chip 20 and a temperature sensor 22. The metal layer 24 and the sensor chip 20 can be packaged within an insulating material 26. The indent and packaged temperature sensor assembly are configured such that the packaged temperature sensor assembly fits within the indent. In some embodiments, the indent is formed solely for the purpose of receiving the temperature sensor assembly. In other embodiments, the indent used to receive the temperature sensor assembly is part of a larger indent formed for another purpose. For example, logos on a cellular telephone can be "printed" or etched into the device cover. The temperature sensor assembly can be placed under a logo block or made as part of the logo block. The shape of the metal layer 24 and the packaged temperature sensor assembly can be application specific. FIG. 5 illustrates a top down view of an exemplary circular configuration of the metal layer 24 and the insulating material 26. The corresponding indent is also circular to accommodate the shape of the packaged temperature sensor assembly. FIG. 6 illustrates a top down view of an exemplary square configuration of the metal layer 24' and the insulating material 26'. The corresponding indent is also square to accommodate the shape of the packaged temperature sensor assembly. FIGS. 3, 5, and 6 show the insulating material as extending beyond the footprint of the metal layer. FIG. 4 illustrates an alternative configuration in which an insulating material 36 is configured within the footprint of the metal layer 24. FIG. 7 illustrates a bottom up view of an exemplary square-shaped metal layer 24' and insulating material 36 according to the configuration of FIG. 6. It is understood that the metal layer, the temperature sensor assembly, the packaged temperature sensor assembly, and the indent can be shaped and sized differently than those configurations shown in FIGS. 2-7.

Figure 8:
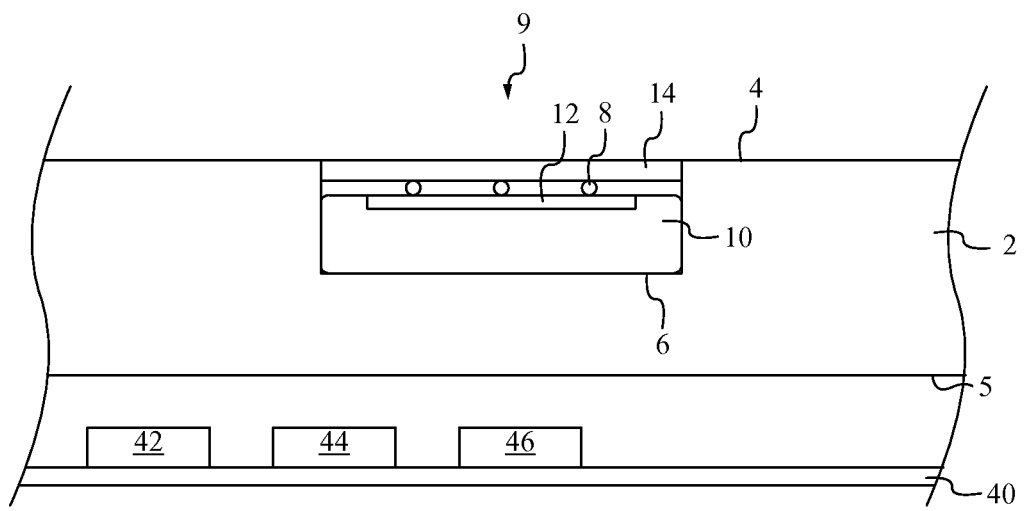
FIG. 8 illustrates a cut-out side view of a portion of an electronic device according to an embodiment.

FIG. 8 illustrates a cut-out side view of a portion of an electronic device according to an embodiment. In an exemplary application, the electronic device is a cellular telephone. Although the electronic device is subsequently described in terms of a cellular telephone, it is understood that the temperature measuring concepts can also be applied to other types of electronics devices. The cellular telephone includes the temperature sensor assembly 9 and the glass cover 2 with indent 6 of FIG. 2 and also a printed circuit board (PCB) 40 having device electronics 42, 44, 46. The device electronics 42, 44, 46 are representative of any heat sources within the cellular telephone, either on or off the PCB 40. Examples of device electronics include, but are not limited to, a central processing unit (CPU) or other processing component, memory, and power supply. The device electronics are also representative of any heat externally added to the device through thermally conductive portions of the housing, for example the body heat of a user holding the device.

Figure 9:
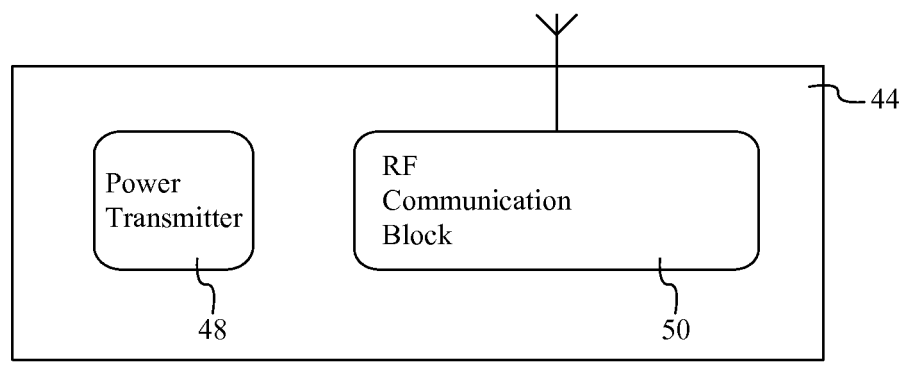
FIG. 9 illustrates a conceptual block diagram of the relevant components of the device electronics for implementing the temperature measuring device.
Figure 10:
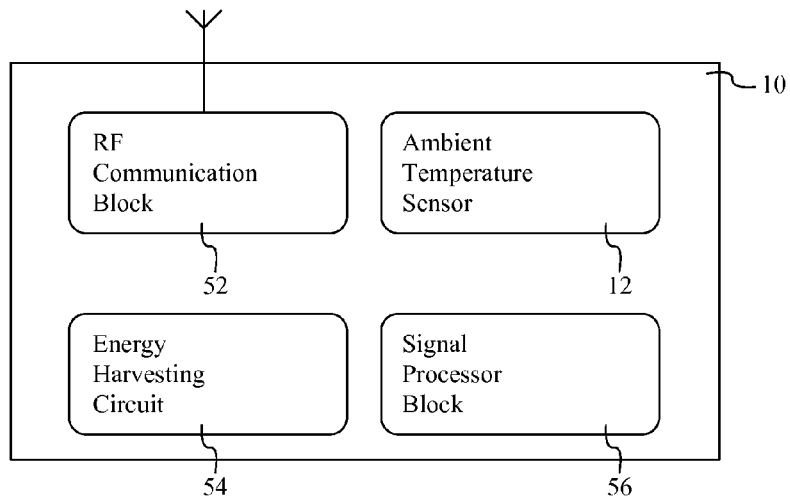
FIG. 10 illustrates a conceptual block diagram of the relevant components within the sensor chip for implementing the temperature measuring device.

The temperature measuring device uses energy harvesting to provide power to the sensor chip and wireless communications to communicate data between the sensor chip and the internal device electronics. In this manner, wires are not used to provide power to the sensor chip, nor are wires used to communicate measured temperature data from the sensor chip to the internal device electronics. This wireless application eliminates manufacturing complexities associated with hard wiring the temperature sensor assembly to the internal device electronics through the glass cover. This wireless application also eliminates heat transfer to the temperature sensor that may occur due to a wired connection to a heat generating device. FIG. 9 illustrates a conceptual block diagram of the relevant components of the device electronics for implementing the temperature measuring device according to an embodiment. The relevant components include a power transmitter 48 and an RF communication block 50. In an exemplary application, the power transmitter 48 and the RF communication block 50 are included within the device electronic 44, which also includes a central processing unit. In some embodiments, the power transmitter 48 and the RF communication block 50 are integrated as part of a single chip, such as shown in FIG. 9. In other embodiments, the power transmitter 48 and the RF communication block 50 are discrete components, or are included in separate chips. FIG. 10 illustrates a conceptual block diagram of the relevant components within the sensor chip 10 for implementing the temperature measuring device according to an embodiment. The sensor chip 10 includes the temperature sensor 12, an RF communication block 52, an energy harvesting circuit 54, and a signal processing block 56.

In operation, the power transmitter 48 transmits a wireless electromagnetic signal, such as an RF signal, that is received by the energy harvesting circuit 54 and harvested for energy. Harvesting energy in this manner is well known in the art and any conventional energy harvesting circuit can be used to implement the energy harvesting circuit 54. The harvested energy is used to power the sensor chip 10. In some embodiments, the power transmitter 48 is positioned directly underneath, or approximately underneath, the sensor chip 10. Since the distance between the power transmitter 48 and the energy harvesting circuit 54 is small, the generated electromagnetic signal can be low-powered. In some embodiments, the sensor chip 10 is configured for low-power consumption, such as in the microwatt range, thereby further reducing the power requirements for the electromagnetic signal transmitted by the power transmitter 48. The power transmitter 48 is under processor control, either from a on-chip processing element or a separate component electrically coupled to the device electronic 44, and the electromagnetic signal is transmitted by the power transmitter 48 when a temperature measurement is required. The transmission periodicity can be adjusted according to the desired need for a temperature measurement, current power levels of the device, or some other criteria. In most applications, a temperature measurement is only needed periodically, and therefore the sensor chip does not have to be continuously powered. In this sense, the power transmitter 48 generates bursts of power, programmed to a desired burst frequency. Decreasing the burst frequency conserves power. In an exemplary application, as the device battery level decreases, the burst frequency can be correspondingly decreased.

Upon energy harvesting the electromagnetic signal received by the energy harvesting circuit 54, the sensor chip 10 powers on for a short duration. While powered on, a temperature measurement is made by the temperature sensor 12 and the signal processor block 56. The temperature measurement is then transmitted as temperature data by the RF communication block 52. The data transmitted can represent the temperature measurement in any of a variety of ways including, but not limited to, a binary stream, a pulse-width modulated signal whose duty cycle represents the temperature measurement, and a series of pulses whose timing interval is representative of the temperature measurement. As used herein, the "temperature data" is used generically to indicate data representative of the temperature measurement. The transmitted temperature data is received by the RF communication block 50 and processed accordingly, such as by the CPU included within the device electronic 44.

Since glass is a thermal insulator, the glass cover 2 provides the temperature sensor 12 a degree of thermal insulation from the heat generated within the cellular telephone by the device electronics 42, 44, 46. In an ideal application, the cover having the indent would have an infinite thermal resistance, thereby completely isolating the temperature sensor 12 from any heat generated within the cellular telephone. In such an ideal case, a single temperature sensor is sufficient to measure the ambient temperature, as the temperature measured by the single temperature sensor would not be effected by any internally generated heat. Even in this ideal case, there is some amount of non-ambient heat due to harvesting the electromagnetic signal and operating the sensor chip. Configuring the sensor chip as a low-power circuit significantly minimizes this effect on the temperature measurement. Additionally, the amount of power harvested and used by the sensor chip is a known quantity, which can be accounted for and subtracted out when the measured temperature data is processed.

In practice however, the glass cover 2 has a finite thermal resistance and therefore heat generated from within the cellular telephone has some effect on the temperature measured by the temperature sensor 12. In some embodiments, additional insulation can be added within the sensor chip 10 and/or within the packaged temperature sensor assembly so as to provide additional heat insulation between the temperature sensor 12 and the heat sources within the cellular telephone.

To provide a greater accuracy of measured ambient temperature, another embodiment of the temperature sensor system adjusts the measured temperature data to compensate for external effects on the temperature sensor. In these embodiments, the temperature sensor assembly is configured with at least two temperature sensors positioned so as to determine a temperature gradient.

Figure 11:
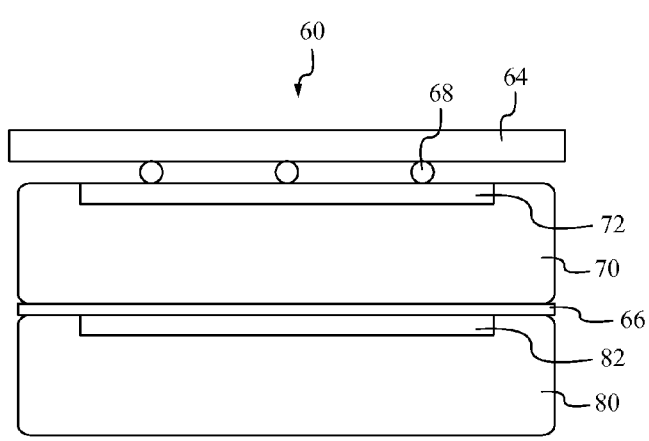
FIG. 11 illustrates a cut-out side view of a temperature sensor assembly having two sensor chips according to an embodiment.

FIG. 11 illustrates a cut-out side view of a temperature sensor assembly 60 having two sensor chips according to an embodiment. The temperature sensor assembly 60 includes a metal layer 64, a sensor chip 70 having a temperature sensor 72, and a sensor chip 80 having a temperature sensor 82. The metal layer 64 is thermally coupled to sensor chip 70 using a thermal interface material, such as solder balls 68. It is understood that alternative thermal interface material can be used. In some embodiments, the sensor chip 70 is secured to the sensor chip 80, such as via an adhesive 66. In some embodiments, the temperature sensor assembly 60 is secured in the indent, such as using an adhesive. It is understood that the temperature sensor assembly 60 can be alternatively shaped and/or sized, or packaged to form a packaged temperature sensor assembly, in a manner similar to that described above in regards to the single temperature sensor configurations. The metal layer 64 covers the temperature sensor 72 so that the temperature sensor 72 is protected from direct exposure to the environment. In some embodiments, the exposed surface of the metal layer 64 is co-planar with the exposed surface 4 (FIG. 1). Once the temperature sensor assembly 60 is positioned within the indent, a polishing step can be performed to achieve this result. It is understood that alternative planarizing methods can be used.

Each of the sensor chips 70 and 80 function similarly as the sensor chip 10 described above in relation to the temperature measuring device of FIG. 8. In the case of the temperature sensor assembly 60, two sets of measured temperature data are measured and transmitted to the device electronics for processing. Each sensor chip 70 and 80 preferably transmits at a different frequency to avoid interference. It is understood that alternative communication mechanisms can be used. For example, the second sensor chip listens for the first sensor to communicate, then the second sensor starts its communication.

Figure 12:
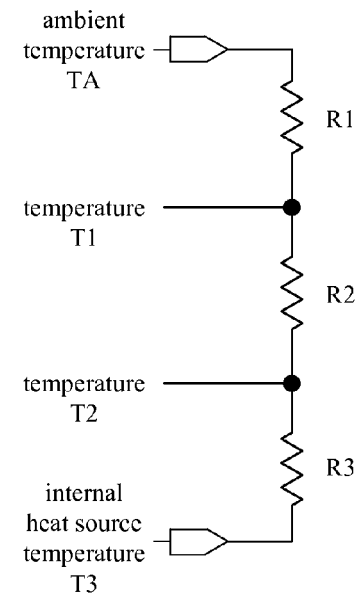
FIG. 12 illustrates a simplified conceptual model of the thermal path between the ambient and the internal heat sources according to an embodiment.

As described above, the measurement obtained by temperature sensor 72 is influenced by both the ambient temperature and the heat generated by the heat sources within the cellular telephone. A thermal path between the ambient and the internal heat sources can be modeled and used to apply one or more correction factors for determining a more accurate ambient temperature measurement. FIG. 12 illustrates a simplified conceptual model of the thermal path between the ambient and the internal heat sources according to an embodiment. Thermal resistance and electrical resistance are quite analogous to each other. As such, each thermal resistance in the thermal path can be modeled as an equivalent electrical resistance. The thermal resistance between the temperature sensor 72 and the ambient is represented as resistor R1. The thermal resistance between the temperature sensor 82 and the temperature sensor 72 is represented as resistor R2. The thermal resistance between the internal heat sources and the temperature sensor 82 is represented as resistor R3. The ambient temperature is represented as temperature TA, the temperature measured by the temperature sensor 72 is represented as temperature T1, the temperature measured by the temperature sensor 82 is represented as temperature T2, and the temperature of the internal heat sources is represented as temperature T3. The thermal path is representative of a resistive divider network having the following relationships:

If $$R3 \gg R1+R2 \text{ or If } R2 \gg R1,$$

Then $$(T2-T1)/R2=(T1-TA)/R1$$

Solving for TA results in:

$$TA=-(R1/R2)*T2+((R1+R2)/R3)*T1 \quad (1)$$

The values of resistors R1 and R2 can be well characterized and are therefore considered to be known quantities. In some embodiments, the values of resistors R1 and R2 are predetermined and stored in memory for subsequent use. In other embodiments, a self-test can be administered to determine the real-time values of the resistors R1 and R2, which are then stored in memory. Equation (1) is programmed into the processor, such as the CPU in device electronic 44 of FIG. 9, and the ambient temperature TA is determined using the known values of resistors R1 and R2 and the measured values for temperatures T1 and T2.

As shown in equation (1), the relationship of the thermal resistances and the measured temperatures provides correction factors for determining the ambient temperature TA. In the case where resistance R1=0, which corresponds to the ideal case where the metal layer is a perfect thermal conductor, then the ambient temperature TA is equal to the measured temperature T1 of the temperature sensor 72 multiplied by the ratio of the resistances R2 and R3. An assumption of equation (1) is that heat flows outward, from the inside of the cellular telephone to the ambient, and therefore a negative correction factor, $-(R1/R2)*T2$, is applied. Under this assumption, equation (1) indicates that the ambient temperature is less than the temperature T1 measured by the temperature sensor 72 because there is some heat added by the internal heat sources. If the temperature T1 is greater than the temperature T2, then a reverse flow of heat is indicated, which is an error condition. Such a condition may occur, for example, if the metal layer is exposed to direct sunlight or other external heat source.

In some embodiments, the values of the resistors R1 and R2 can be determined as a function, such as a function of pressure, humidity, orientation of the device, or some other variable, or combination of variables. These variables can be values measured by other sensors on the cellular telephone. For example, a cellular telephone can be configured with a pressure sensor for determining altitude, or a gyroscope for measuring the tilt, or orientation of the device. Orientation may impact the temperature measurement due to the location of the temperature sensor and the fact that hotter air rises. The measured values for these variables can be compared to the initialized values used when the device was originally calibrated. The difference in values can then be used to adjust the values of the resistors R1 and R2. The values of the resistance R1 and R2 can also be adjusted according to the current power level of the cellular telephone. In general, algorithms can be developed to compensate for errors due to variable operating conditions. The operating conditions are initially characterized during manufacturing. Look-up tables can be used to provide correction factors according to real-time operating conditions.

Conceptually, the ambient temperature is calculated using a temperature gradient, where the temperature gradient is determined by measuring temperatures at different points along a vector from inside the device to the ambient. In the embodiments described above, two discrete temperature sensor elements are positioned at two different locations along the vector to measure two positional temperatures. In an alternative embodiment, a monolithic configuration is used having two different junctions, separately positioned along a vector from inside the device to the ambient, where the two different junctions are each accessible for measuring a temperature at the junction. In an exemplary application, the temperature is measured at two different junctions of a vertical or horizontal P-N-P transistor. The measured temperature at each P-N junction varies depending on the depth of the P-N junctions in the transistor.

Embodiments of the temperature measuring device described herein are directed to an energy harvesting system that includes a power transmitter and an energy harvesting circuit to harvest energy from an electromagnetic signal transmitted by the power transmitter. In other embodiments, other energy harvesting mechanisms are considered. In an example, a solar cell is used, such as a solar cell built into the top cover or placed adjacent to the heat plate, and the solar cell is coupled to the one or more sensor chips. In still other embodiments, the power transmitter is a light source, and the solar cell harvests energy from the light emitted by the light source. In this case, the solar cell is coupled to the sensor chip, or is part of the sensor chip, and can be positioned anywhere that enables exposure to the light emitted by the light source.

Embodiments of the temperature measuring device described herein are directed to positioning the temperature sensor assembly within the device top cover. In other embodiments, the temperature sensor assembly can be embedded in a protective cover or carrying case of the device. For example, in a cellular telephone, the protective cover is an insulating sleeve that slips on to the phone. In this way, the temperature sensor assembly becomes an accessory. The temperature sensor assembly can store calibration data, and can transmit this calibration data whenever a temperature measurement is transmitted.

The present application has been described in terms of specific embodiments incorporating details to facilitate the understanding of the principles of construction and operation of the temperature measuring device. Many of the components shown and described in the various figures can be interchanged to achieve the results necessary, and this description should be read to encompass such interchange as well. As such, references herein to specific embodiments and details thereof are not intended to limit the scope of the claims appended hereto. It will be apparent to those skilled in the art that modifications can be made to the embodiments chosen for illustration without departing from the spirit and scope of the application.

What is claimed is:

1. An electronics device having a device housing and one or more heat generating device electronics positioned within the device housing, the electronics device comprising:
   a. a heat plate exposed to the ambient;
   b. the device electronics comprise a power transmitter configured to transmit an electromagnetic signal;
   c. a first sensor chip comprising a first temperature sensor thermally coupled to the heat plate and configured to measure first temperature data, a first energy harvesting circuit configured to harvest energy from the transmitted electromagnetic signal, and a first wireless communication transmitting block configured to transmit the first temperature data;
   d. a second sensor chip comprising a second temperature sensor configured to measure second temperature data, a second energy harvesting circuit configured to harvest energy from the transmitted electromagnetic signal, and a second wireless communication block configured to transmit the second temperature data;
   e. the device electronics comprise a wireless communication receiving block configured to receive the transmitted first temperature data and the transmitted second temperature data; and
   f. the device electronics comprise a processor coupled to the wireless communication receiving block and configured to calculate an ambient temperature according to the first temperature data and the second temperature data.

2. The electronic device of claim 1 wherein the first sensor chip is stacked on top of the second sensor chip.

3. The electronic device of claim 1 wherein the processor is configured to perform an algorithm to calculate the ambient temperature, wherein the ambient temperature is a function of the first temperature data, the second temperature data, a first thermal resistance between the heat plate and the first temperature sensor, and a second thermal resistance between the first temperature sensor and the second temperature sensor.

4. The electronic device of claim 3 wherein the electronic device further comprises one or more of a pressure sensor, a humidity sensor, and a gyroscope, and the first thermal resistance is a function of data measured by one or more of the pressure sensor, the humidity sensor, and the gyroscope.

5. The electronic device of claim 3 wherein the electronic device further comprises one or more of a pressure sensor, a humidity sensor, and a gyroscope, and the second thermal resistance is a function of data measured by one or more of the pressure sensor, the humidity sensor, and the gyroscope.

6. The electronic device of claim 3 wherein the first thermal resistance is a function of a current power expenditure of the electronic device.

7. The electronic device of claim 3 wherein the second thermal resistance is a function of a current power expenditure of the electronic device.

8. The electronic device of claim 1 wherein the heat plate, the first sensor chip, and the second sensor chip are integrated within an insulating material to form a packaged temperature sensor assembly.

9. The electronic device of claim 1 further comprising a cover coupled to the device housing, wherein the cover comprises an insulating material and is positioned to separate the device electronics from the ambient environment.

10. The electronic device of claim 9 wherein the cover includes an indent formed in an exposed surface of the cover, wherein the heat plate, the first sensor chip, and the second sensor chip are positioned within the indent.

11. The electronic device of claim 10 wherein the heat plate includes a first surface exposed to the ambient and a second surface opposite the first surface and facing the first sensor chip, wherein the first surface of the heat plate is co-planar with the exposed surface of the cover.

12. The electronic device of claim 10 wherein the heat plate, the first sensor chip, and the second sensor chip are integrated within an insulating material to form a packaged temperature sensor assembly, further wherein a size and shape of the packaged temperature sensor assembly is configured to match a size and shape of the indent.

13. The electronic device of claim 9 wherein the insulating material comprises glass.

14. The electronic device of claim 1 further comprising a thermal interface material coupled between the heat plate and the first temperature sensor of the first sensor chip.

15. The electronic device of claim 1 wherein the first sensor chip further comprises a first signal processing circuit and the second sensor chip further comprises a second signal processing circuit.

16. The electronic device of claim 1 wherein the electronic device comprises a mobile electronic device.

17. The electronic device of claim 1 wherein the second temperature sensor is positioned further from the heat plate and closer to the power transmitter, the wireless communication receiving block, and the processor than the first temperature sensor.

18. The electronic device of claim 1 wherein the first wireless communication transmitting block and the second wireless communication transmitting block are configured to transmit the first temperature data at a different frequency than the second temperature data.

* * * * *